(12) United States Patent
Saifullah et al.

(10) Patent No.: US 8,055,482 B2
(45) Date of Patent: Nov. 8, 2011

(54) INTEGRATING MULTIPLE DESIGN SYSTEMS IN A CAD SYSTEM

(75) Inventors: Sikandar Saifullah, Issaquah, WA (US); Katrin Eleanor Grunawalt, Ann Arbor, MI (US); William Fredrick Glasgow McCord, Atlanta, GA (US)

(73) Assignee: Autodesk, Inc., San Rafael, CA (US)

( * ) Notice: Subject to any disclaimer, the term of this patent is extended or adjusted under 35 U.S.C. 154(b) by 344 days.

(21) Appl. No.: 12/367,311

(22) Filed: Feb. 6, 2009

(65) Prior Publication Data

US 2010/0204961 A1  Aug. 12, 2010

(51) Int. Cl.
*G06F 17/50* (2006.01)
(52) U.S. Cl. .......................................................... 703/1
(58) Field of Classification Search .................. 703/1, 4, 703/6, 7, 13, 14, 15, 21
See application file for complete search history.

(56) References Cited

U.S. PATENT DOCUMENTS 5,109,337 A * 4/1992 Ferriter et al. .................. 705/29
7,043,408 B2 * 5/2006 Camiener et al. ................. 703/1

* cited by examiner

*Primary Examiner* — Paul Rodriguez
*Assistant Examiner* — Russ Guill
(74) *Attorney, Agent, or Firm* — Gates & Cooper LLP

(57) ABSTRACT

A method, apparatus, and article of manufacture provide the ability to integrate multiple engineering design systems in a computer aided design (CAD) system. A design generator is displayed and used to create an engineering design that has different worksheets. Each worksheet represents a different aspect of the design, has local design objects that represent functional aspects of a component that are independent from the component's physical representation, and relation objects that models constraints for properties of the design objects. The objects are organized into a functional layout document (FLD) that is stored in a data center/database that is shared by the worksheets. The FLD is then used to design an engineering design/model.

16 Claims, 4 Drawing Sheets

INTEGRATING MULTIPLE DESIGN SYSTEMS IN A CAD SYSTEM

BACKGROUND OF THE INVENTION

1. Field of the Invention

The present invention relates generally to computer-aided design (CAD) systems, and in particular, to a method, apparatus, and article of manufacture for integrating multiple subsystems for a conceptual engineering design within a CAD system.

2. Description of the Related Art

Mid-range and high-end CAD systems of today attempt to streamline a user's workflow by optimizing commands and data-structures for building a single, detailed, sometimes very large, 3D model. Users must focus on tying every piece of geometry to every other so that any edit to any portion of the model will cause the rest of the model to update. However, the highly iterative, rough, abstract and piece-wise nature of early stage design becomes difficult to undertake within an essentially monolithic design approach adopted by such CAD systems. Designers end up resorting to various disparate niche software tools, resorting to various data catalogs, to 'hand' references to previous designs, to mental references to the company's rules of thumb, etc., in order to accomplish their task.

Several inefficiencies arise from handling the early stage design task in this manner:

Increased cost of operation: Designers buy and maintain different software programs No coherent data-model: Downstream operations cannot take full advantage of the work Leaves room for error: Holds to reason since so much is left to a manual regimen Different tools, different results: Computations vary across stages of the design cycle Re-usability limitation: Not easy to use a previous conceptual design as a starting point Project timeline stretch: Combination of inefficiencies lead to increased project time Accordingly, what is needed is a flexible approach (within a CAD system) to integrate multiple tools, subsystems, software programs, and objects in the early stage or conceptual engineering design stage.

SUMMARY OF THE INVENTION

One or more embodiments of the invention recognizes 'early stage' or conceptual engineering design as requiring a different, more flexible approach within a CAD system. To provide the flexible approach, a new document type called the Functional Layout Document (FLD) is provided. Early stage design is captured in an incremental data-model called the Functional Component Description (FCD) within the powerful and very flexible environment of the FL Document. The FCD can, at any time, be rendered into a simple XML for further processing within various contexts, including downstream detailing.

The architecture provides the ability to integrate different engineering design systems by enabling several loosely-connected sub-systems, that can collectively be referred to as "knowledge base", to interact seamlessly inside the FL Document. The objective is to allow the designer to focus on the creative aspect of his/her task and spend less time "working" the parts of the system.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
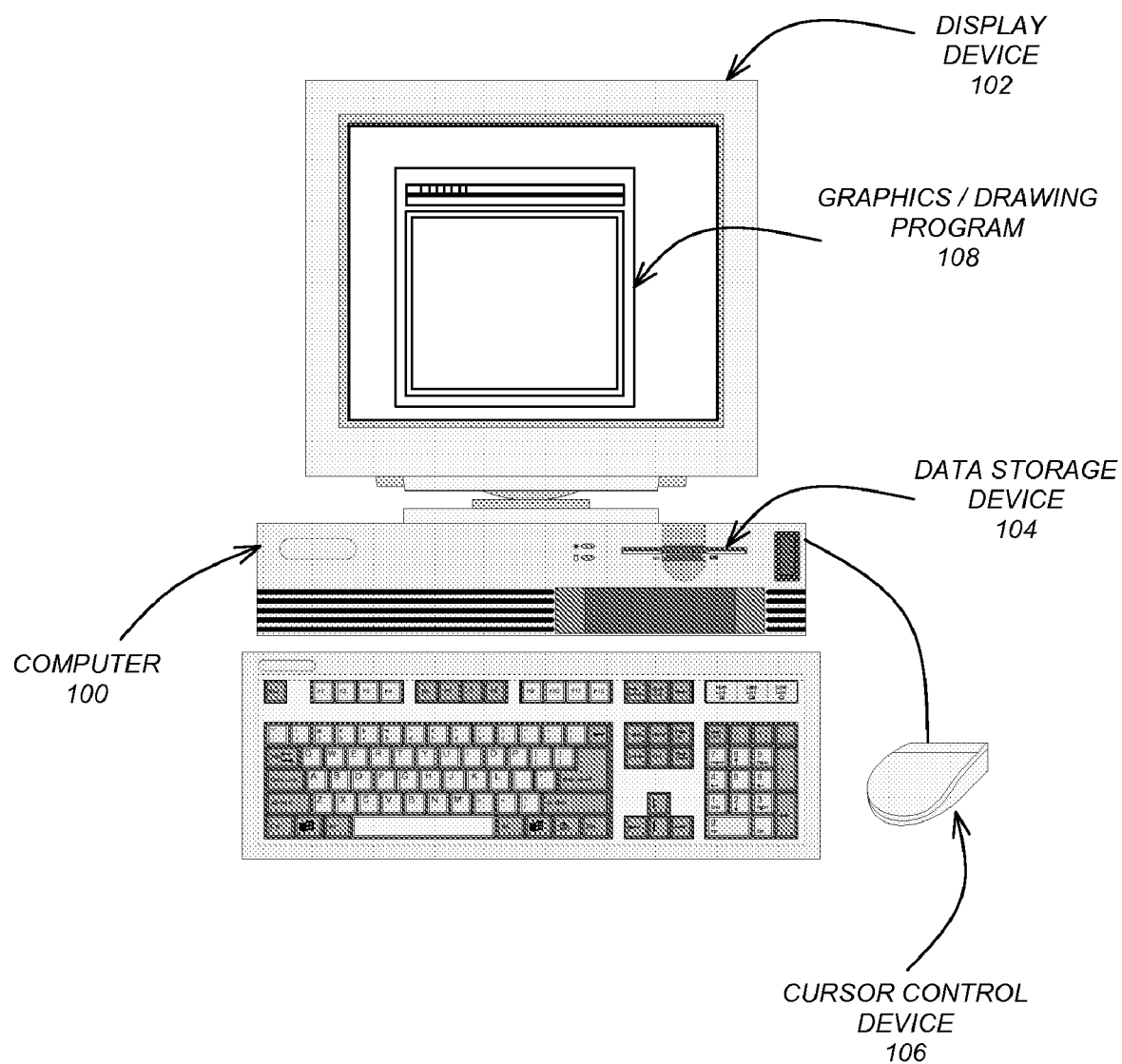
FIG. 1 is an exemplary hardware and software environment used to implement one or more embodiments of the invention.

FIG. 1 is an exemplary hardware and software environment used to implement one or more embodiments of the invention. Embodiments of the invention are typically implemented using a computer 100, which generally includes or are communicatively coupled to, a display device 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented graphics program 108, wherein the graphics program 108 is represented by a window displayed on the display device 102. Generally, the graphics program 108 comprises logic and/or data embodied in/or readable from a device, media, carrier, or signal, e.g., one or more fixed and/or removable data storage devices 104 connected directly or indirectly to the computer 100, one or more remote devices coupled to the computer 100 via a data communications device, etc. Such a graphics program 108 may consist of a computer-aided design (CAD) program, a solid modeling system, a two-dimensional (2D) or three-dimensional (3D) modeling system, a schematic system, mathematical analysis and computing system, a spreadsheet application, cataloging application, or any other system that provides the ability to visually represent and/or create a design environment.

In one or more embodiments, instructions implementing the graphics program 108 are tangibly embodied in a computer-readable medium, e.g., data storage device 104, which could include one or more fixed or removable data storage devices, such as a zip drive, floppy disc drive, hard drive, CD-ROM drive, DVD drive, tape drive, etc. Further, the graphics program 108 is comprised of instructions which, when read and executed by the computer 100, causes the computer 100 to perform the steps necessary to implement and/or use the present invention. Graphics program 108 and/or operating instructions may also be tangibly embodied in a memory and/or data communications devices of computer 100, thereby making a computer program product or article of manufacture according to the invention. As such, the terms "article of manufacture" and "computer program product" as used herein are intended to encompass a computer program accessible from any computer readable device or media.

Those skilled in the art will recognize that the exemplary environment illustrated in FIG. 1 is not intended to limit the present invention. Indeed, those skilled in the art will recognize that other alternative environments may be used without departing from the scope of the present invention.

Software Embodiments

Figure 2:
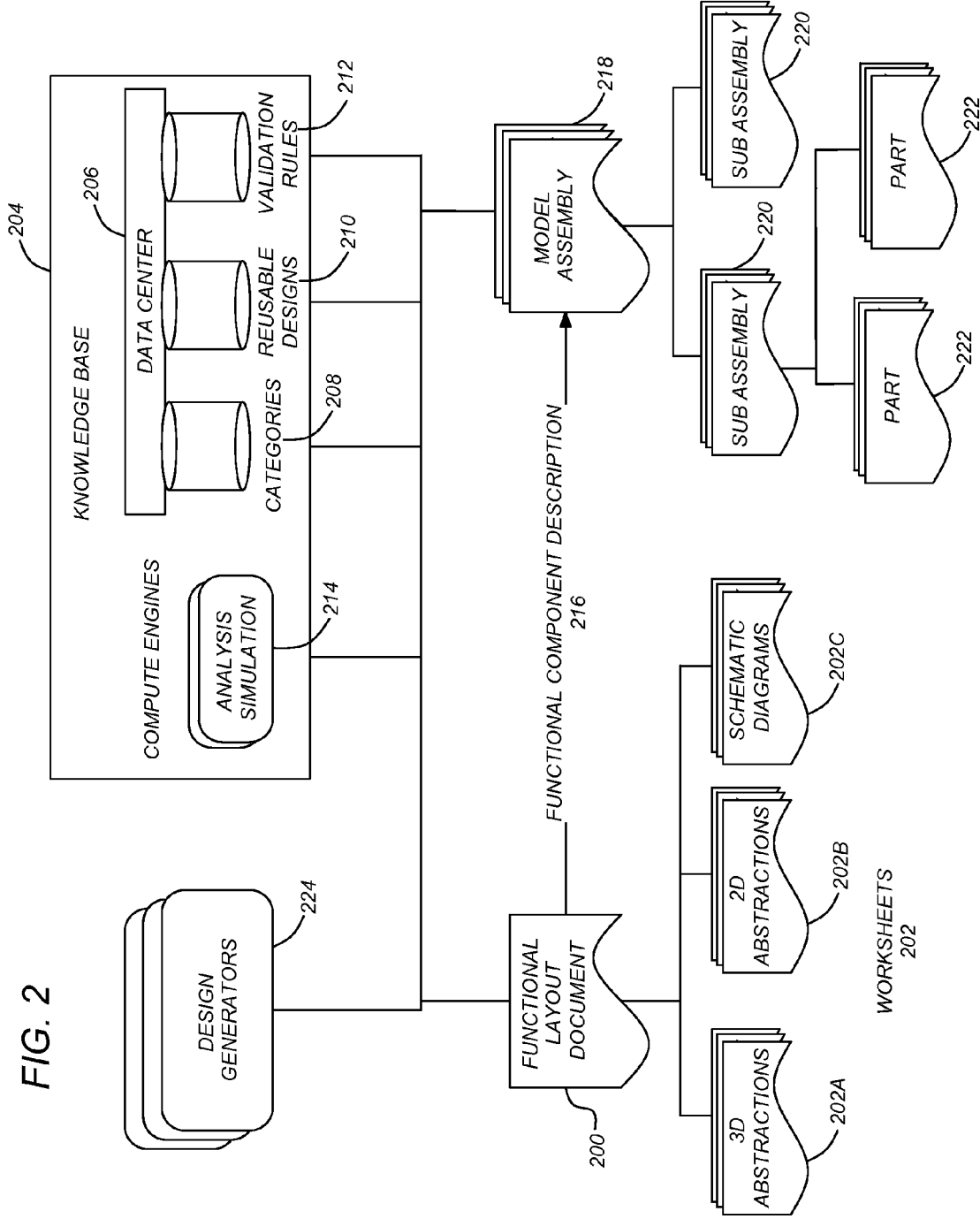
FIG. 2 illustrates the various elements and components used to create a flexible engineering design in accordance with one or more embodiments of the invention.

Embodiments of the invention enable the ability to integrate multiple different CAD systems/subsystems into a single graphics/CAD program 108. Such embodiments may be more easily understood with an enumeration of specific elements that may exist. FIG. 2 illustrates the various elements and components used to create a flexible engineering design in accordance with one or more embodiments of the invention.

Document Composition

Worksheets of Varying Dimensionality

The Functional Layout (FL) Document 200 follows the paradigm of a notebook with different work-sheets 202 representing different aspects of a design. Each work-sheet 202 can be of a different type or dimensionality. For example, worksheets may exist for 3D abstractions/abstract models 202A, 2D abstractions/abstract sketches 202B, schematic/flow diagrams 202C, mathematical equations (raw functional behavior) (e.g., using MatLab™ tools for performing numerical computations), etc.

Each worksheet 202 is powered by exactly the same underlying framework and data-base found intrinsically in the CAD system. The architecture also allows for newer worksheet types to be added dynamically (e.g., "on the fly" in real-time during processing) by third party clients/developers/designers without the CAD system having fore-knowledge about such newer worksheets at compile time.

A great deal of the commonality found in the individual workflows within the various worksheet types is factored out and re-purposed for use in a consistent manner in the FL Document 200. For example, a single browser view and interaction may be provided regardless of whether the design is being performed using purely mathematical equations or 2D sketches 202B or 3D abstract shapes 202A. This kind of flexibility and consistency is made possible by the introduction of design objects.

Local Design Objects

Figure 3:
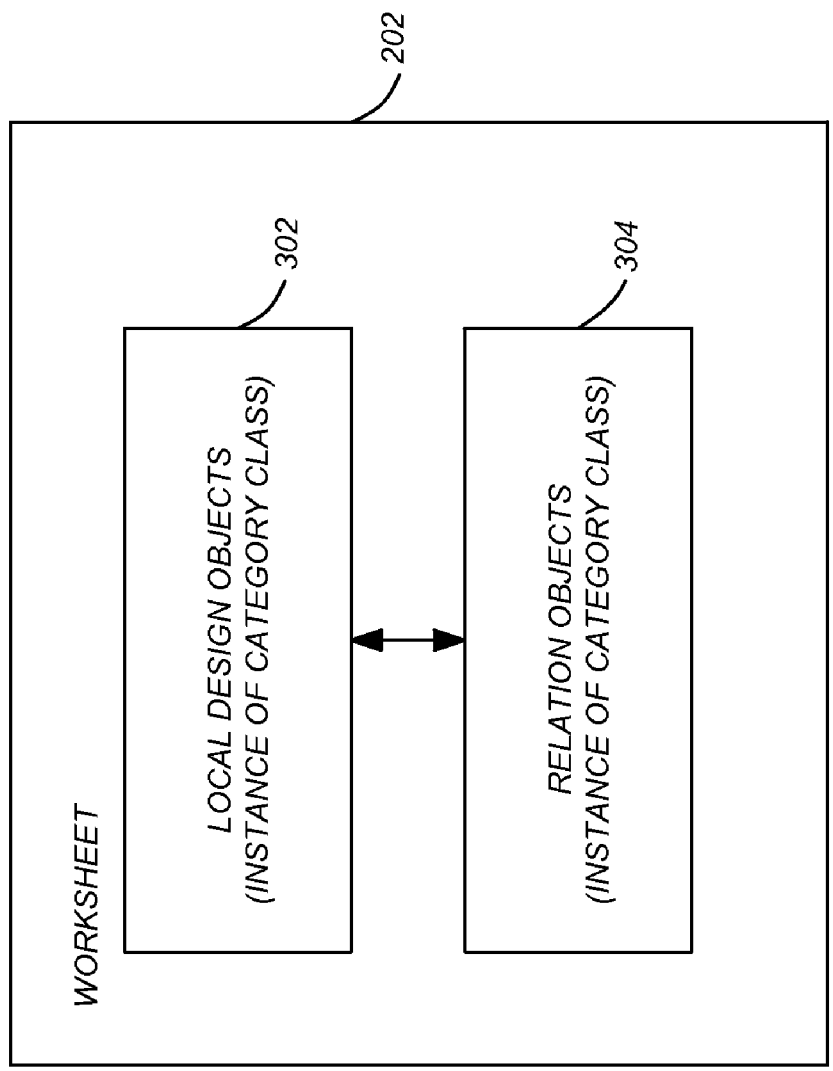
FIG. 3 illustrates the content of a worksheet in accordance with one or more embodiments of the invention.

FIG. 3 illustrates the content of a worksheet 202 in accordance with one or more embodiments of the invention. The user can model aspects of his/her design at arbitrary levels of detail, capturing each aspect in a work-sheet 202. The process consists of the user building a set of "design objects" 302 (also referred to as local design objects) in the work-sheet 202 which represent more the functional aspects of the components and to a lesser extent their physical detail. The design objects 302 are only loosely coupled with the physical representations of the component. The physical representation, quite often, exists for the purpose of providing the graphical and/or geometrical handles for manipulation. For example, a design object 302 for a link in a 4-bar mechanism is only concerned about a "length" parameter, but its physical representation might show a sketched symbol (i.e., the physical representation of the 4-bar mechanism component that is displayed to the user).

Relation Objects

The all-important relationship between these design objects 302 is captured with what is called a "relation object" 304. The relation object 304 models the constraints that must be obeyed by the properties or parameters of the design objects 302.

The design objects 302 and relation objects 304 together capture the entire design intent, no more no less. Due to their detachment from the more physical aspect of the geometry, a greater flexibility is possible in capturing the essential design.

Master Design Objects

In order to satisfy the often contradictory goals of allowing freedom to design sub-systems while at the same time keeping all sub-systems tightly in synch, the concept of local design objects 302 and global design objects is introduced. Every work-sheet 202 has its design objects local 302, while a master list of the global or "master" design objects may be continually maintained. Master design objects can loosely be defined as a "union" of all the design objects 302 in the worksheets 202. They provide the ability to track and manage which category parameters of which local design object 302 are being utilized.

The system of local design objects 302 in worksheets 202 and the master design objects at the "top" is leveraged to manage a semi-automatic update of the worksheets 202. When changes are made in one part of the design other parts of the design can be updated (e.g., automatically/semi-automatically—without additional user input or independent of/from further user actions). In this regard, the list of master design objects can be used to find and update all of the local design objects. Further, if one design object affects another design object, the master object list can be used to update any relations.

The allowance in the system for designers to intervene in directing the flow of such an "update" is useful in catering to the iterative and fluid nature of early design.

Thus, in each design, there may be multiple different master or global design objects that together constitute the final design. For example, in a motor assembly, there are multiple different objects/parts such as a driveshaft, pistons, cylinders, etc. Each object/part may be represented by a master design object. In turn the different worksheets may define different aspects of each master design object. For example, a 2D worksheet 202B may provide a 2D abstraction of the motor assembly, while a 3D worksheet 202A may provide a 3D abstraction of the motor assembly. The different local design objects 302 in each worksheet 202 defines an aspect of the master design object. Accordingly, a local design object 302 in the 2D worksheet 202B may define a 2D abstraction for the driveshaft, while a local design object 302 in the 3D worksheet 202A may define a 3D abstraction for the same driveshaft (which is represented by a master design object).

The master design object manages all of its constituent local design objects 302. The master design object may also manage any conflicts between its local design objects and provide a single master design object that is used in the design. Such conflict management may be conducted with or without input and interaction from the user. For example, the master design object may require the user to elect between conflicting parameters from two different local design objects 302 in different worksheets 202. Alternatively (or in addition), the master design object may utilize a predefined set of rules to determine which properties from which local design object 302 to utilize.

Data Center

Referring again to FIG. 2, a knowledge base 204 maintains information for using and testing a design. The knowledge base 204 maintains some of the information in a shared database referred to as the data center 206. The data center 206 contains categories 208, reusable designs 210, and validation rules 212.

The data center 206 is the general facility that allows centralized access to all data that is re-usable and shareable. These include previously designed models 210 and raw engineering data which are to be used by designers during the course of their work. The models and data are organized in a systematic fashion that enables quick search and instantiation.

The set of categories 208 and their definitions are stored in the data center 206. As noted earlier, such information is centrally and independently managed to enable consistent communication. Further, design validation rules 212 are stored centrally in this data center 206. The use of validation rules 212 allows for consistency of design across an entire group or groups of designers.

Categories

Each design and relation object is viewed as an instance of a strong-type class. The class is called a category 208. A category's definition, including its properties, a.k.a category parameters, may be stored in XML syntax. All categories 208 are managed inside the shared database of the data center 206. A category 208 can be likened to a class in Java™ or C++ which supports inheritance.

Besides the category parameters, the category 208 also defines the "functional behaviors" of the objects that claim to conform to it. These functional behaviors can be thought of as equations or constraints that must be obeyed by some of the category parameters.

Categories 208 form the heart of the system enabling communication at the engineering behavior level. Since they are stored in a centrally accessible database 206 they enable various commands and software modules to understand each other—their inputs and outputs—with relative ease, using the "interface" of categories 208 and their parameters.

Re-Usable Designs

As in most engineering projects, a good portion of the design is very likely to have been previously generated. Embodiments of the invention may build on such prior designs as much as possible. The existence of such designs is formalized in the form of reusable designs 210 that are stored persistently in a shared database of the data center 206. The reusable designs 210 are thus easily and uniformly accessible within one or more commands.

Design Validation Rules

Design validation rules 212 attempt to automate the application of rules that are often developed within a design company. Such rules 212 may take the form of validation rules that verify conformance of certain portions of the design to a pre-defined set of rules. In other words, a designer or company may establish a set of conditions or ranges for certain category parameters or for the relationship between different categories. Such rules are reflected by the validation rules 212. Further, embodiments of the invention may allow statements of fact (rules) to be added in any order at any time.

The application of the rules 212 can take place pro-actively where the system flags the designer the moment an action is taken that is non-conforming. Alternatively, the application of rules 212 can take place more passively, with the designer "pushing a button" requesting a validity check be performed for conformance to the stored set of rules.

Compute Engines

Analysis and Simulation

To achieve the design objective the user inevitably needs measurement tools that provide feedback about the goodness (e.g., stability and quality) of his/her design. In a functional modeling system, such tools refer to various engineering analysis and simulation tools 214. These modules 214 are considered essentially stateless—the state of some facet of the current design is used as input, and computed information is output in some useful form that the designer can use to evaluate the design strategy.

The modules or engines 214 operate on design objects 302 and relation objects 304 and are thus removed from the actual representation of the model under consideration. Such a strategy enables the analysis and simulation on data models that may be incomplete in many aspects. It is the level of indirection and abstraction afforded by the design objects 302 that provides such capabilities.

Public Data Model

Functional Component Description

The set of design objects 302 and relation objects 304 built in the FL Document 200 can be rendered into a related XML syntax called the FCD 216. Each design object 302 and relation object 304 in the FCD 216 is an XML element that hosts the specific values of the category parameters. Accordingly, a succinct form of the design is provided without any loss of relevant design detail. Due to its simple and tractable nature, the design can be further rendered into alternative embodiments such as a traditional 3D model with the help of some heuristics and intelligent defaults supplied to fill the gaps. Once such a 3D model is emitted, further detailing can be carried out on top of it, in a more traditional manner. Thus, as illustrated in FIG. 2, the FCD 216 provides/emits one or more model assemblies 218 that can have sub-assemblies 220 with parts 222.

The FCD 216 is leveraged for updating the emitted 3D model 218 when the conceptual design is edited in the FL Document 200. Accordingly, designers may obtain and evaluate the differences between a former FCD 200 and a new FCD 200 and provide algorithmic assessments as to what parts of the 3D detail model 218 needs to be tweaked and how.

Since a global perspective on the changes made in the conceptual design are provided, it becomes possible to compute the procedures that need to be executed on specific parts of the 3D detail model 218 so as to synchronize the changes with an actual model. Such synchronization may be performed without losing independent edits done by the detailer.

FCD's 216 transportability and transformability can be used to work the design into dissimilar CAD systems while preserving the essential design. For example, an air-conditioning unit designed in a solid modeling application can be transported into a building information modeling system by developing an "interpreter" for the FCD representation 216 of the air-conditioner (i.e., in the solid modeling application) that can materialize into a building information modeling system "air-conditioner" in the form that it is needed in for such a system.

Interaction Agents

Design Generators

The design objects 302 and relation objects 304 are built up using a wide array of commands and datasets available through the FL Document 200 interface. The objects 302 and 304 are commonly built modularly into environments. Each environment is a specialization of the graphical user interface (GUI) for particular disciplines of mechanical design (e.g., mechanical linkage design, hydraulic manifold design, etc.)

Each such environment enhances the "static" knowledge-base of the system by contributing special datasets 208, reusable designs 210, rules of design 212, analysis and simulation engines 214. Each environment may also contribute a specialized application programming interface (API) to the overall CAD-system. All of these facilities (GUI, data 208, rules 212, computers, API, etc.) that extend the FL document 200 behavior combine to constitute a design generator 224.

FIG. 2 illustrates how the FL document 200 is acted upon by the designer through the various design generators 224 available at the time. The FCD 216 is output from the FL document 200 aiding in producing the detail design in the form of the different model assemblies 218. The overall system illustrated in FIG. 2 accounts for the design taking several iterations between conceptual design and detail design. The same knowledge-base 204 is utilized in the conceptual design phase as well as the detail design. The idea is to keep the entire experience seamless, from conceptual to detail design. Further, the transition from concept to detail design may be left to the designer. In this regard, embodiments may not dictate what should live in the conceptual document and what should be considered "detail".

A basic design generator 224 may always be available as part of a core system. The commands and analysis capabilities available in a basic design generator 224 may be generic but powerful enough to enable a designer to build designs fruitfully. Additionally, the same functional design paradigms embraced in general by the system form the underpinnings of the basic design generator 224.

Users/designers may leverage the structure and power of the overall system of the invention by utilizing AddIns (e.g., provided by third parties/entities) that may provide specialized design generators 224. With such specialization comes ease of use since the designer is communicating precisely in the language of the engineer. They bring in specialized data and analysis and simulation techniques 214 and a GUI that is very aware of the particular class of systems being designed. Despite the specialization, every design generator 224 uniformly produces design objects 302 and relation objects 304 that contribute to the FL Document's FCD 216.

Overview

In the prior art, designers were forced to resort to multiple different individual and separate applications in the early design stage. The ability to integrate data from the different systems was either impossible or a long and arduous manual process. For example, once a design was complete, all of the design data (in its various forms) had to be manually moved over into a traditional CAD system for further detail design.

One or more embodiments of the invention overcome the problems of the prior art by providing design generators 224 that can be used to create various designs and models that are provided in the form of worksheets to the user. For example, a designer may be constructing a wiper-blade assembly. An FL document 200 may be viewed with 2D 202B and schematic worksheets 202C being used to develop and create the basics of the linkage and motor assembly respectively. An analysis of the output of the velocity at some specified points in the linkage can also be viewed (e.g., using an analysis simulation engine 214). A starting point for the detail design may be generated and produce a solid modeling assembly document 218. The components in the assembly 218 may be filled in based on the FCD 216 and the data center 206 connected to the system. Components that are not found in the data center 206 may have virtual components put in place that can be worked upon further by the detailer.

Thus, embodiments of the invention allow different aspects of the design to be modeled in different dimensionality—2D 202B if the third dimension is not a factor, schematic relationship diagrams 202C if geometry itself is not a factor, and/or 3D 202A if some design features require three dimensions. The concept of local objects 302 and master design objects allow the designer to freely model an aspect of the design without having to keep all other aspects in synch at the same time. Further, the entire design may be captured at a uniformly high functional level described in an XML schema. Such capabilities allow for the transformation of the data into other forms such as a 3D detail assembly more easily than in the prior art. In addition, the system integrates the analysis and simulation engines found in most prior art CAD systems, directly into the early stages of design, where very little may be known about the geometry of the components. Lastly, the concept and use of a shared database 206 provides the ability to use the same content database as the traditional CAD system enabling the concept of "publish once, use everywhere".

Logical Flow

Figure 4:
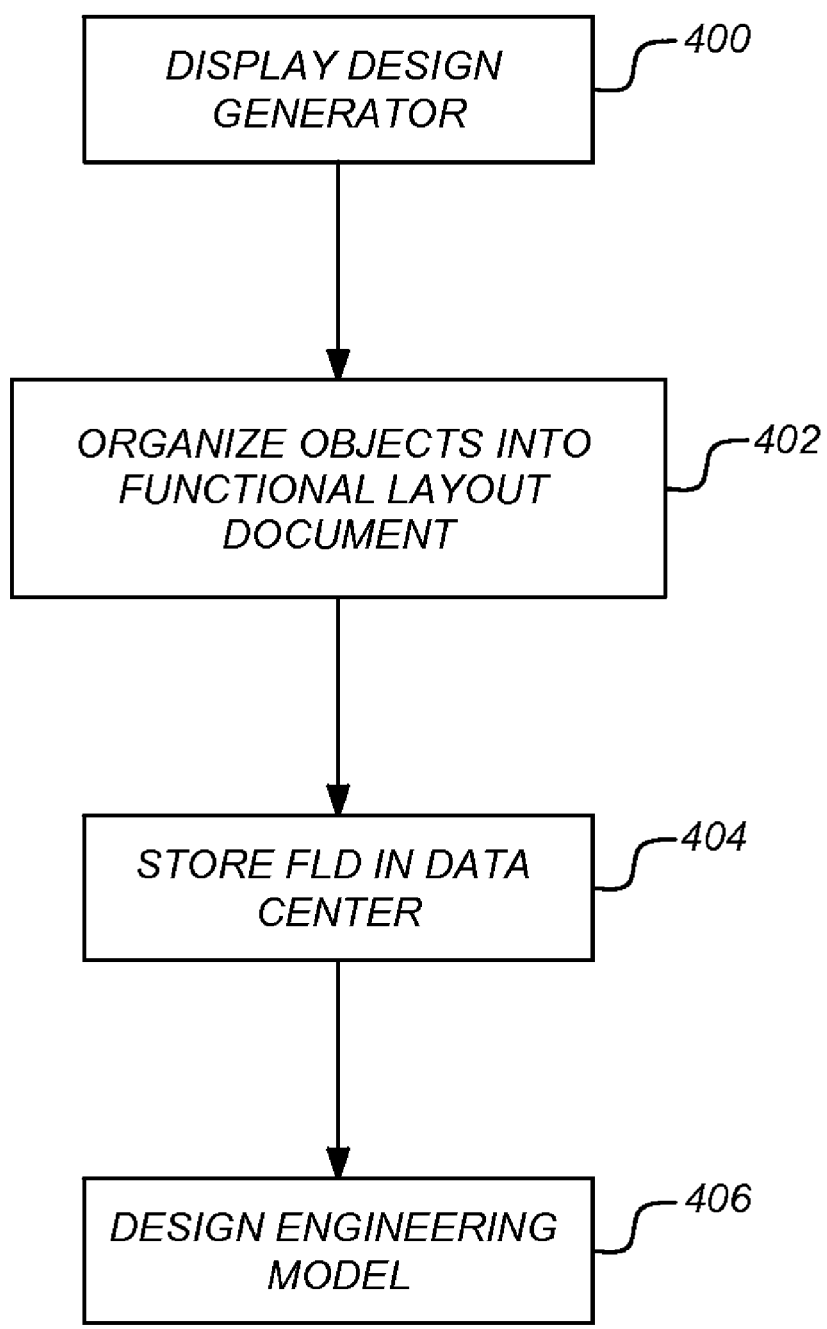
FIG. 4 is a flow chart illustrating the logical flow for integrating multiple engineering design systems in a computer-aided design (CAD) system in accordance with one or more embodiments of the invention.

FIG. 4 is a flow chart illustrating the logical flow for integrating multiple engineering design systems in a computer-aided design (CAD) system in accordance with one or more embodiments of the invention. At step 400, a design generator is displayed on a display device. Such a design generator is configured, via an application programming interface (API), to accept input from a designer that results in the creation of an engineering design. Such an engineering design has two or more different worksheets 202. Each worksheet represents a different aspect of the engineering design, and has one or more local design objects 302 and one or more relation objects 304. Each local design object 302 represents a functional aspect of a component (of the engineering design) and is independent from a physical representation of the component (e.g., is only loosely coupled to the physical representation). Each relation object 304 models constraints of one or more properties of the design objects.

During step 400, master design objects may be created. Since the worksheets 202 represent different aspects of a design, the master design object serves to organize and manage the different local design objects 302 from the different worksheets. Accordingly, each master design object is an amalgamation of one or more of the local design objects 302 from the two or more different worksheets 202. Each local design object 302 in a master design object refers to a particular aspect of the master design object. The master design object serves to manage the different local design objects 302 for a particular aspect of the design. For example, a master design object may represent a drive shaft while local design objects 302 in the different worksheets 202 may provide different aspects of the drive shaft (e.g., a 2D schematic, a mathematical operation for the drive shaft's movement, etc.). The master design object serves as an amalgamation of the different local design objects 202 that represent the different aspects of the drive shaft. There can be many different master design objects in a design that each serve as an amalgamation of the different local design objects for individual aspects of the master design.

In addition, a design generator 224 may be used/defined for a particular environment that is a specialization of a graphical user interface for a particular discipline of mechanical design.

At step 402, the local design objects 302 and relation objects 304 are organized into an FLD 200.

At step 404, the FLD 200 is stored in a data center 206 that provides a shared database within the CAD system. The shared database is shared by two or more worksheets 202. Also stored in the shared database 206 may be design validation rules 212 that verify conformance of the local design objects 302 to a pre-defined set of rules. The shared database 206 may further contain reusable designs 210 that establish a particularly identified set of local design objects 302 and relation objects 304.

At step 406, the FLD 200 is used, via user input, to design an engineering model/design (e.g., a model assembly 218). Such a step may further include the ability to render the FLD 200 into an extensible markup language (XML) syntax based FCD 216 (i.e., an FCD 216 that is XML based). Each of the master design objects and relation objects 304 in the FCD 216 are instances of a category class having category parameters. The FCD 200 may further be rendered into a specific design model 218 that is displayed within a second CAD system. The original CAD system (i.e., that is used to produce the FCD 216 and the second CAD system may be dissimilar/different CAD systems.

Step 406 may further involve using engineering analysis/simulation tools 214 that operate on the local design objects 302 or relation objects 304 to produce computed information. Such computed information is used to evaluate the design strategy formed by the local design objects 302 and relation objects 304.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for integrating multiple engineering design systems in a computer aided design (CAD) system, comprising:
   (a) displaying, on a display device of the CAD system, a design generator configured, via an application programming interface (API), to accept input from a designer that results in the creation of an engineering design wherein the engineering design comprises two or more different worksheets, wherein each worksheet:
      (i) represents a different aspect of the engineering design;
      (ii) comprises one or more local design objects, wherein each local design object:
         (1) represents a functional aspect of a component; and
         (2) is independent from a physical representation of the component;
      (iii) comprises one or more relation objects, wherein each relation object models constraints of one or more properties of the one or more design objects;
   (b) organizing the one or more local design objects and one or more relation objects in an Functional Layout Document (FLD);
   (c) storing the FLD in a data center comprising a shared database within the CAD system, wherein the shared database is shared by the two or more worksheets;
   (d) using the FLD, via user input and the display device, to design the engineering design; and
   (e) creating one or more master design objects each comprised of an amalgamation of one or more of the local design objects from the two or more different worksheets, wherein:
      (i) each local design object in the master design object refers to a different particular aspect of the master design object; and
      (ii) each master design object manages all of its constituent local design objects.

2. The method of claim 1, further comprising rendering the FLD into an extensible markup language (XML) syntax based Functional Component Description (FCD), wherein each of the master design objects and one or more relation objects in the FCD comprises an instance of a category class having category parameters.

3. The method of claim 2, further comprising:
   (a) rendering the FCD into a specific design model of a second CAD system; and
   (b) displaying the design model, on the display device, within the second CAD system.

4. The method of claim 3, wherein the CAD system and the second CAD system are different CAD systems.

5. The method of claim 1, further comprising storing, in the shared database, one or more design validation rules wherein the one or more design validation rules verify conformance of the one or more local design objects to a pre-defined set of rules.

6. The method of claim 1, further comprising storing, in the shared database, one or more reusable designs comprised of a specified set of one or more local design objects and one or more relation objects.

7. The method of claim 1, further comprising:
   (a) using one or more engineering analysis/simulation tools that operate on one or more of the local design objects or relation objects to produce computed information; and
   (b) evaluating, using the computed information, a design strategy, formed by the one or more local design objects and one or more relation objects.

8. The method of claim 1, further comprising defining a design generator for a particular environment that is a specialization of a graphical user interface for a particular discipline of mechanical design.

9. A computer implemented system for integrating multiple engineering design systems in a computer aided design (CAD) system, the system comprising:
   (a) a computer;
   (b) a display device communicatively coupled to the computer;
   (c) the CAD system executing on the computer and displayed on the display device;
   (d) two or more different worksheets, wherein each worksheet:
      (1) represents a different aspect of an engineering design;
      (2) comprises one or more local design objects, wherein each local design object:
         (i) represents a functional aspect of a component of the engineering design;
         (ii) is independent from a physical representation of the component;
      (3) comprises one or more relation objects, wherein each relation object models constraints of one or more properties of the one or more design objects;
   (e) one or more master design objects each comprised of an amalgamation of one or more of the local design objects from the two or more different worksheets, wherein:
      (1) each local design object in the master design object refers to a different particular aspect of the master design object; and
      (2) each master design object manages all of its constituent local design objects;
   (f) a data center comprising a shared database within the CAD system, wherein the shared database is shared by the two or more worksheets;
   (g) a Functional Layout Document (FLD) stored in the data center, wherein the FLD organizes the one or more local design objects and one or more relation objects; and (h) a design generator executed by the CAD system, wherein the design generator is configured, via an application programming interface (API) and the FLD, to accept input from a designer that results in the creation of the engineering design, wherein the engineering design comprises the two or more different worksheets.

10. The system of claim 9, further comprising an extensible markup language (XML) syntax based Functional Component Description (FCD) that has been rendered from the FLD, wherein each of the master design objects and one or more relation objects in the FCD comprises an instance of a category class having category parameters.

11. The system of claim 10, further comprising a specific design model of a second CAD system that has been rendered from the FCD, wherein the specific design model is displayed on the display device within the second CAD system.

12. The system of claim 11, wherein the CAD system and the second CAD system are different CAD systems.

13. The system of claim 9, further comprising one or more design validation rules that are stored in the shared database, wherein the one or more design validation rules verify conformance of the one or more local design objects to a predefined set of rules.

14. The system of claim 9, further comprising one or more reusable designs stored in the shared database, wherein the one or more reusable designs are comprised of a specified set of one or more local design objects and one or more relation objects.

15. The system of claim 9, further comprising:
 (a) using one or more engineering analysis/simulation tools that operate on one or more of the local design objects or relation objects to produce computed information; and
 (b) evaluating, using the computed information, a design strategy, formed by the one or more local design objects and one or more relation objects.

16. The system of claim 9, further comprising defining a design generator for a particular environment that is a specialization of a graphical user interface for a particular discipline of mechanical design.

* * * * *